United States Patent Office 2,847,296
Patented Aug. 12, 1958

2,847,296

EXOTHERMIC MANGANESE ADDITION AGENTS

Donald C. Hilty, Niagara Falls, Philip H. Crayton, Tonawanda, and John J. Darby, Niagara Falls, N. Y., assignors to Union Carbide Corporation, a corporation of New York No Drawing. Application May 12, 1954
Serial No. 429,374

10 Claims. (Cl. 75—27)

This invention relates to improved exothermic reaction mixtures, and more particularly concerns exothermic manganese addition agents for a ferrous melt.

The big problem in adding manganese metal to a steel or cast iron bath is finding improved means for recovering manganese values in the melt. The addition of manganese in ferrous baths is already marginal, much of the alloying element being lost as a result of oxidation. Ladle additions are more satisfactory, but further difficulty is encountered in adding manganese alloy because of the heat absorbed in dissolving the cold, manganese addition. This absorption of heat by the manganese alloy addition reduces the temperature of the metallic bath, and the resulting temperature drop, if substantial enough, may in turn cause the segregation of important alloying ingredients. Such temperature drop will also increase skull formation.

It is an important object of this invention to introduce manganese additions to molten steel in the form of an exothermic mixture to overcome the objectionable effects listed above.

Another object of the present invention is to provide a manganese-containing exothermic mix for a steel melt, the mix having a relatively high proportion of manganese content, and characterized by a more complete recovery of manganese than has heretofore been possible by the use of non-exothermic manganese addition agents.

A further object of the invention is to provide an exothermic addition agent for facilitating the incorporation of manganese values in a steel melt, the addition agent being capable of evolving sufficient heat for effecting rapid solution of the manganese early in the tap to promote uniform distribution therein.

The above objects are accomplished by forming an exothermic reaction mixture comprising one or more ferromanganese alloy addition agents, an oxidizing agent and a reducing agent. Based on the discovery that sufficient exothermicity and other beneficial reactions may be obtained by the reduction of either manganese ores ($MnO_2$) or iron ores ($Fe_2O_3$) by metallic reducing agents such as silicon, aluminum, or calcium, the oxidizing agent of the present invention comprises at least one of these ores, manganese ore being the preferred oxidant in the present instance, because it adds manganese to the melt. The reducing agent may be aluminum, silicon, or calcium or any combination thereof. Preferably, the reducing agent should be a constituent of an alloy such as ferro-silicon aluminum, silicomanganese-aluminum, calcium-silicon or calcium-silicon-aluminum.

Included in the mix of the invention is an accelerator. The presence of the accelerator is essential for without the benefit of the accelerator, the evolution of heat would not be rapid enough to reduce substantially the temperature drop occurring when the mixture is administered to a steel melt. This accelerator may comprise compounds of alkali metal carbonates, alkali metal halides, alkaline earth metal carbonates or alkaline earth metal halides. Typical accelerators that may be used in the practice of the invention are lime, cryolite, calcium fluoride and sodium carbonate. By employing any of these accelerators either alone or in combination with each other in the present exothermic reaction mixture, and varying the percentages of the accelerator, the rate of propagation of heat is influenced, and also the rate of solution of the alloying material.

The composition of the reaction mixture may be varied over a considerable range without impairing its exothermic properties. Because of this, the mix is applicable to a variety of steel-making procedures practiced in different steel mills. For example, using as a reducing agent an alloy such as silicomanganese-aluminum or ferrosilicon-aluminum in the mix of the invention, a substantial percentage of useful manganese additive in the form of a ferromanganese alloy may be efficiently incorporated in a steel melt when the composition of the exothermic mixture is within the range indicated below in Table I.

TABLE I

*Percent of component in exothermic reaction mixture*

| Component | | Preferred Range | Maximum Range |
|---|---|---|---|
| Fuel | SiMnAl | 14–18 | 5–25 |
| | or | | |
| | FeSiAl | 8–12 | 10–30 |
| Ore | Fe Ore (54% Fe) | 0–10 | 0–28 |
| | or | | |
| | Mn Ore (55% Mn) | 28–32 | 20–35 |
| | or | | |
| | Combined (Fe Ore plus Mn Ore) | 20–32 | 15–35 |
| Accelerator | Soda Ash | 0.5–2 | 0.5–4 |
| | or | | |
| | Fluorspar | 1–2 | 0.25–4 |
| | or | | |
| | Combined (soda ash plus fluorspar) | 1–3 | 0.5–4 |
| FeMn | H. C. FeMn¹ | 48–59 | 45–70 |
| | or | | |
| | M. C. FeMn² | 48–60 | 45–70 |
| | or | | |
| | L. C. FeMn³ | 45–65 | 40–75 |

¹ High carbon.
² Medium carbon.
³ Low carbon.

In the above table the fuel may have a range of composition as follows:

| | Preferred Range | Maximum Range |
|---|---|---|
| Silicon | 10–31% | 5–35%. |
| Aluminum | 10–60% | 5–65%. |
| Manganese | 0–65% | 0–70%. |
| Iron and Impurities | Remainder | Remainder. |

The composition range shown above in Table I is based upon the use of stoichiometric proportions of iron ore and/or manganese ore as the oxidant, and, as reducing agents, aluminum and silicon. Thereby, the reducing agent is present in sufficient quantity to substantially reduce the oxidic ore in the mix. Following are some of the main exothermic reactions, which account in large measure for the reduction in chill during the alloying operation.

Manganese ore:
$$Si + 2MnO_2 \rightarrow Mn_2SiO_4 + heat$$
$$4Al + 3MnO_2 \rightarrow 2Al_2O_3 + 3Mn + heat$$

Iron ore:
$$3Si + 4Fe_2O_3 \rightarrow 3Fe_2SiO_4 + 2Fe + heat$$
$$Si + 2Fe_2O_3 \rightarrow Fe_2SiO_4 + FeO + heat$$
$$2Al + Fe_2O_3 \rightarrow Al_2O_3 + 2Fe + heat$$

Other side reactions which occur during ignition of the reaction mix, and which contribute to the exothermicity thereof are:

$$Si + 3MnO_2 \rightarrow 2MnSiO_3 + Mn + heat$$
$$2Al + 3MnO_2 \rightarrow Al_2O_3 + 3MnO + heat$$

or $$2Al + 3Fe_2O_3 \rightarrow Al_2O_3 + 6FeO + heat$$

The oxides of manganese and iron, formed as a result of the above reactions, are believed to form complex compounds or solutions in the by-product slag formed during the reaction.

As previously stated, manganeses ore is the preferred oxidant in the mix of the present invention. However, as shown in Table I, iron ore and manganese ore may be combilned in the exothermic mix embodying the invention, but the iron ore should not exceed more than one-half the total ore content.

In mixes of the invention employing calcium, silicon and aluminum as constituents of the reducing agent, ferromanganese alloy may be effectively incorporated in the steel bath when the composition range of the exothermic mixture is within the limits prescribed below in Table II. The calcium may be incorporated in the mix as a constituent of an alloy, preferably calcium-silicon or calcium-silicon-aluminum.

TABLE II

*Percent of component in exothermic reaction mixture*

| Component | | Preferred Range | Maximum Range |
|---|---|---|---|
| Fuel | CaSi | 8-22 | 5-30 |
| | or | | |
| | CaSiAl | 10-13 | 5-20 |
| Ore | Fe Ore (54% Fe) | 0-29 | 0-32 |
| | or | | |
| | Mn Ore (55% Mn) | 0-32 | 0-36 |
| | or | | |
| | Combined Fe Ore and Mn Ore. | 20-32 | 15-36 |
| Accelerator | Soda Ash | 0.5-2 | 0.5-4 |
| | or | | |
| | Fluorspar | 0.5-2 | 0-3 |
| | or | | |
| | Combined Soda Ash and Fluorspar. | 1-2 | 0.5-4 |
| FeMn | H. C. FeMn | 50-65 | 45-70 |
| | or | | |
| | M. C. FeMn | 50-65 | 45-70 |
| | or | | |
| | L. C. FeMn | 45-70 | 40-75 |

The above composition range presupposes a stoichiometric proportion of oxidizing and reducing agents in the mix of the invention so that practically all of the oxidic ore may be reduced in accordance with the following reaction formulas.

Mn ore:
$$Ca + MnO_2 \rightarrow CaO + MnO + heat$$
$$Si + 2MnO_2 \rightarrow Mn_2SiO_4 + heat$$
$$4Al + 3MnO_2 \rightarrow 2Al_2O_3 + 3Mn + heat$$

Fe ore:
$$Ca + Fe_2O_3 \rightarrow CaO + 2FeO + heat$$
$$3Si + 4Fe_2O_3 \rightarrow 3Fe_2SiO_4 + 2Fe + heat$$
$$2Al + Fe_2O_3 \rightarrow Al_2O_3 + 2Fe + heat$$

Based on exothermicity tests, the following side reactions also occur:

Mn ore:
$$Si + 3MnO_2 \rightarrow 2MnSiO_3 + Mn + heat$$
$$2Al + 3MnO_2 \rightarrow Al_2O_3 + 3MnO + heat$$

Fe ore:
$$Si + 2Fe_2O_3 \rightarrow Fe_2SiO_4 + 2FeO + heat$$
$$2Al + 3Fe_2O_3 \rightarrow Al_2O_3 + 6FeO + heat$$

The oxides listed above probably combine to form complex compounds or solutions in the by-product slag formed during the reaction.

While manganese ore is preferred as an oxidant in the mix of Table II, manganese ore and iron ore may be utilized either alone or in combination with each other without affecting to any significant degree the exothermic characteristics of the mix. In any case, the minimum ore content should be at least 15% of the total mix.

In practicing the invention, the heat producing reactants, ground to 100 mesh size (i. e., capable of passing through a screen having 0.15 mm. openings), are admixed with sufficient ferromanganese of approximately 20 mesh size (0.83 mm. openings) or smaller to produce an exothermic alloy addition agent containing at least 45% available manganese.

The mix of the invention may then be applied to the melt in either bonded or unbonded form. In the present instance, the addition agent is added in the form of pellets made by compacting the powdered mixture at approximately 2000 p. s. i. A slight amount of water may be added as a binder.

In order to indicate still more fully the nature of the present invention, the following examples of its use are set forth, it being understood that these examples are presented as illustrative only, and that they are not intended to limit the scope of the invention.

The data reported immediately below are the results of a series of three tests in each of which a sufficient quantity of manganese addition agent was added to a 100 pound bath of molten steel to raise the manganese content of the steel 1%, the bath being at a temperature of about 1600° C.

EXAMPLE I

Additions of a mix were made to 100 pound high-frequency induction furnace steel heats. The addition comprised:

| | Percentages |
|---|---|
| Ferrosilicon-aluminum | 10.3 |
| Manganese ore | 30.5 |
| Sodium carbonate | 1.0 |
| Calcium fluoride | 1.2 |
| Ferromanganese | 57.0 |

The ferrosilicon-aluminum in the mix contained 30.90% silicon and 57.38% aluminum. After incorporating the addition in the steel melt, the temperature drop and solution time were observed and recorded. In accordance with this procedure, exothermicity tests showed an average temperature drop of 9° C. and a solution time of 40 seconds. Final analysis revealed negligible aluminum or silicon recoveries in every case. High manganese recoveries, approximately 6% in excess of the amount added as ferromanganese, indicated additional recovery from the manganese ore.

EXAMPLE II

In a series of tests similar to the tests conducted in Example I, an exothermic mix was added to 100 pound baths of molten steel prepared as above. The mix contained 16.3% silicomanganese-aluminum, 30.2% manganese ore, 1.0% sodium carbonate, 2.0% calcium fluoride and 50.5% ferromanganese. The silicomanganese-aluminum alloy contained 9.42% silicon and 48.28% aluminum. Sufficeint quantity of this mix was added to raise the manganese content of the steel bath 1%. An average temperature drop of less than 5° C. and a solution time averaging 38 seconds confirmed the acceptability of this exothermic mix. Similar to Example I, in this series of tests more manganese was recovered than was added as silicomanganese-aluminum and ferromanganese, the recovery tests indicating an additional recovery of about 4.5% from the manganese ore.

EXAMPLE III

In a test similar to those described in Examples I and II, an exothermic mix including calcium-silicon-iron alloy as the reducing agent, and a mixture of manganese ore and iron ore as the oxidant, was employed. The mix consisted of:

| | Percent |
|---|---|
| Fe ore | 6.5 |
| Mn ore | 15.0 |
| Sodium carbonate | 1.3 |
| Ferromanganese | 57.0 |
| Calcium-silicon alloy | 20.2 |

The calcium-silicon alloy comprised 67.03% silicon, 29.18% calcium and 1.40% iron. Tests indicated a temperature drop of 9° C. and a solution rate of 45 seconds.

EXAMPLE IV

Another test similar to the previous tests was conducted, the reactants being calcium-silicon-aluminum and Mn ore. The mix had a composition consisting of:

| | Percent |
|---|---|
| Mn ore | 30.75 |
| Sodium carbonate | 1.00 |
| Calcium fluoride | 1.00 |
| Ferromanganese | 57.00 |
| Calcium-silicon-aluminum | 10.25 |

The calcium-silicon-aluminum contained 28.24% calcium, 50.07% silicon and 18.8% aluminum. Results of this test indicated a temperature drop of 9° C. and a solution rate of 35 seconds. Moreover, the manganese values recovered in this test exceeded by about 10%, the amount added as ferromanganese, indicating recovery of approximately 56% of the manganese in the manganese ore.

Although the percentages of elements in the special alloys used as fuels in the above experiments of Examples III and IV produced optimum results, their ranges within the mixtures can be widened without sacrificing the exothermicity of the alloy additions. Acceptable percentages are as follows:

| | Preferred Range | Maximum Range |
|---|---|---|
| Ca | 29-33% | 25-35%. |
| Si | 48-67% | 45-70%. |
| Al | 0-21% | 0-25%. |
| Iron+Impurities | Remainder | Remainder. |

Exothermic mixes having a composition within the ranges indicated in Tables I and II, when added to a steel melt, generate sufficient heat to substantially decrease the normal temperature drop of the melt. Moreover, as a result of accelerator action, the heat generated is released within a sufficiently short time, not exceeding 45 seconds, so that the useful manganese content of the mix may be rapidly dissolved early in the tap, and have more opportunity to become uniformly distributed throughout the melt. Further, because of the presence of relatively small amounts of silicon and aluminum, or silicon, aluminum and calcium, as the case may be, an available manganese alloy content of at least 45% may be maintained in the mix, and maximum recovery of this available manganese may be effected.

It will be understood that modifications and variations may be effected without departing from the novel concepts of the present invention.

What is claimed is:

1. An addition agent for incorporating manganese into molten iron and steel comprising 5% to 25% silico-manganese-aluminum alloy, 20% to 35% manganese ore, 0.5% to 4% soda ash, remainder ferromanganese alloy, and characterized by high exothermicity and fast solution rate.

2. An addition agent for incorporating manganese into molten iron and steel comprising 10% to 30% ferrosilicon-aluminum alloy, 20% to 35% manganese ore, 0.5% to 4% soda ash, remainder ferromanganese alloy, and characterized by high exothermicity and fast solution rate.

3. An addition agent for incorporating manganese into molten iron and steel comprising 5% to 25% silico-manganese-aluminum alloy, up to 28% iron ore, 0.5% to 4% soda ash, remainder ferromanganese alloy, and characterized by high exothermicity and fast solution rate.

4. An addition agent for incorporating manganese into molten iron and steel comprising 5% to 25% silico-manganese-aluminum alloy, 15% to 35% iron ore and manganese ore, the iron ore not exceeding one-half the total ore content, 0.5% to 4% soda ash, remainder ferromanganese alloy, and characterized by high exothermicity and fast solution rate.

5. An addition agent for incorporating manganese into molten iron and steel comprising 5% to 30% calcium-silicon alloy, up to 36% manganese ore, 0.5% to 4% soda ash, remainder ferromanganese alloy, and characterized by high exothermicity and fast solution rate.

6. An addition agent for incorporating manganese into molten iron and steel comprising 5% to 20% calcium-silicon-aluminum alloy, up to 36% manganese ore, 0.5% to 4% soda ash, remainder ferromanganese alloy, and characterized by high exothermicity and fast solution rate.

7. An addition agent for incorporating manganese into molten iron and steel comprising 5% to 30% calcium-silicon alloy, up to 32% iron ore, 0.5% to 4% soda ash, remainder ferromanganese alloy, and characterized by high exothermicity and fast solution rate.

8. An addition agent for incorporating manganese into molten iron and steel comprising 5% to 20% calcium-silicon-aluminum alloy, 15% to 36% iron ore and manganese ore, 0.5% to 4% soda ash, remainder ferromanganese alloy, and characterized by high exothermicity and fast solution rate.

9. In an exothermic reaction mixture including an alloy addition for a ferrous melt capable upon ignition in the melt of generating sufficient heat to permit the addition of said alloy without causing an objectionable temperature drop, said mixture consisting of at least one oxidizing agent from the group consisting of manganese ore and iron ore and at least one reducing agent from the group consisting of silicon, calcium, aluminum and alloys thereof, the improvement comprising the use of at least one accelerator from the group consisting of alkali metal halides, alkali metal carbonates, alkaline earth metal halides and alkaline earth metal carbonates for the improved recovery of manganese, said alloy being present as ferromanganese.

10. An addition agent for incorporating manganese into molten iron and steel comprising at least one ore selected from the group consisting of iron ore and manganese ore up to about 35 percent; from about 5 percent to 30 percent of at least one reducing agent selected from the group consisting of silicon, calcium, aluminum and alloys thereof; at least one accelerator selected from the group consisting of alkali metal halides, alkali metal carbonates, alkaline earth metal halides and alkaline earth metal carbonates in an amount up to about 4 percent; and the remainder ferromanganese; said addition agent characterized by high exothermicity and fast solution rate.

References Cited in the file of this patent

UNITED STATES PATENTS

| | | |
|---|---|---|
| 906,009 | Goldschmidt | Dec. 8, 1908 |
| 1,593,660 | Lubowsky | July 27, 1926 |
| 1,609,969 | Schroeder | Dec. 7, 1926 |
| 2,221,784 | Critchett et al. | Nov. 19, 1940 |
| 2,290,273 | Burgess | July 21, 1942 |
| 2,462,871 | Kinzel | Mar. 1, 1949 |
| 2,481,599 | Kinzel | Sept. 13, 1949 |
| 2,705,196 | Wever et al. | Mar. 29, 1955 |